United States Patent Office 3,600,326
Patented Aug. 17, 1971

3,600,326
PREPARATION OF HYDROPHOBIC SILICA AND USE THEREOF
James D. Wilcox, Fallston, and Joel M. Klein, Baltimore, Md., and Frederick A. Hudon, Jr., Bristol, Conn., assignors to the United States of America as represented by the Secretary of the Army
No Drawing. Filed Feb. 27, 1968, Ser. No. 708,493
Int. Cl. B01j 13/00
U.S. Cl. 252—309
8 Claims

ABSTRACT OF THE DISCLOSURE

The method for preparing hydrophobic silica, the steps comprising milling a mixture comprising colloidal silica, inert solvent, and silicone with subsequent removal of the said solvent. The hydrophobic silica may be combined with millable substances giving use to a product with high dispersibility.

The invention described herein may be manufactured, used, and licensed by or for the Government for governmental purposes without the payment to us of any royalty thereon.

This invention relates to the preparation of a dry colloidal hydrophobic silica and the use with other components forming mixtures thereof.

The object of this invention is to prepare colloidal hydrophobic silica mixtures in a dry state.

A further object is to prepare mixtures with high dispersibility characteristics.

A method for preparing mixtures of colloidal silica with other components is disclosed by Wortley, Jr., et al. in U.S. Pat. No. 3,192,105. This method requires the preparation of a mixture of alpha-chloroacetophenone (hereinafter caller CN) and silica by preparing a slurry of CN dissolved in acetone and mixed with colloidal silica. The acetone is flashed off crystallizing the CN on the silica as nucleation sites forming a final mixture having small particles and being relatively free-flowing. This final product does not have sufficient dispersibility as an aerosol when disseminated from a low energy blower such as the Mity Mite as will be discussed below. The above procedure produces relatively large agglomerates up to and exceeding one millimeter in size in the final mixture.

An investigation was instituted to produce mixtures of high dispersibility with colloidal silica when used in low-energy blowers.

As a result of our studies we have discovered a novel method of modifying silica which when combined with other dry substances produces a final mixture that can be disseminated by any low-energy system with the desired circulation in all directions.

The method for preparing the silica comprises milling a mixture comprising colloidal silica and about 1–3 liters volatile naphtha, Skellysolve F, which is treated with 10–25% by weight of a silicone based on the weight of said silica. The final mixture is milled for about 15–60 minutes with the subsequent flashing of the naphtha, giving rise to the hydrophobic silica.

The final mixture comprises the above prepared hydrophobic silica with a millable substance in the ratio 5–95% to 95–5% respectively with subsequent grinding for about 3–24 hours producing a free flowing, highly dispersible dry mixture in the particle size range of 1–30 microns. The preferred particle size being between 1–10 microns.

The millable substance can be any substantially dry material capable of being ground such as the various incapacitating agents for controlling crowds, various smoke generating substance as used for signaling.

Various known silicones can be utilized in our method such as trichloromethyl silane, trimethylchlorosilane, phenyldimethylbromosilane, hexamethylcyclotrisilazane, hexamethyldisilazane and hexylpolysilazane. The preferred silicone is hexamethyldisilazane.

The various inert solvents as the liquid medium should possess the following characteristics: relative volatility, that is a boiling point range, of 50°–100° C., contain no readily removable H— or OH— groups and a solvent for the silicones. Typical solvents include acetone, methyl ethyl ketone, gasoline, benzene, and Skellysolve F which is a mixture of hydrocarbons with an average of 6 carbon atoms per molecule.

In the grinding process where the mixture particles are being reduced in size, large quantities of new surfaces are being continuously formed and it is believed that the smaller hydrophobic silica particles are coating these newly formed surfaces on the other components of the mixture as soon as they are formed. We have found that as little as about 5% of the converted silica in the mixture is required to impart high dispersibility to the final mixture.

An unexpected and unobvious result in the use of our converted silica renders the final mixture to spread in all directions as a fine mist or cloud which characteristics have not been found in the prior art mixtures. The latter mixtures have been free-flowing but have not had the desired dispersibility as shown in the following example as a result of our testing:

Substantially 100 gram sample of the following mixtures of A, B and C were disseminated into a closed area, i.e. tunnel using a low energy dispenser. Since all of the said mixtures were free-flowing and non-clogging from the dispenser, the prime criteria for distinguishing between them was their dispersibility as being the amount of the mixture deposited on the enclosed walls, floors, and the travel of the aerosol cloud down the length of the closed area. Each mixture was separately disseminated at the same rate for the same amount of time from the dispenser. The results disclosed that mixture C, prior art, had the poorest dispersibility; the sample did not spread through the enclosure but to the contrary substantially fell upon the ground immediately in front of the dispenser and not entering the enclosure. However, mixtures A and B were found deposited along the entire length of the closed area on the floors and walls. These tests clearly demonstrated that free-flowing is a property distinct from dispersibility.

Sample mixture

A—mixture of 50% CN and 50% by the method of this invention
B—mixture of 67% CN and 33% by the method of this invention
C—mixture prepared according ot U.S. Pat. No. 3,192,105.

The performance of the mixtures after various treatments and experiments indicate that our converted colloidal silica serves many different functions in addition to promoting dispersibility such as grinding aid and anti-agglomerant.

The following typical examples of the invention are given by way of illustration and not by way of limitation.

EXAMPLE 1

Preparation of hydrophobic silica

A slurry comprising about 185 grams silica and about 2 liters of a volatile naphtha, Skellysolve F, is placed in a U.S. Stoneware size 1 milling jar loaded with equal weights of ½" x ½" and $13/16$" x $13/16$" Burundum rods to about 50% of the jar's capacity with the addition of about 38 grams (50 cc., sp. gr. about 0.76) hexamethyldisilazane followed by about 30 minutes of milling. The naphtha was removed from the slurry by drying in an oven to produce the desired silica. The weight ratio of silica to said silazane is 5:1.

The above procedure was followed employing the weight ratio 4:1 of silica to said silazane respectively.

EXAMPLE 2

A dry mixture comprising 50% silica prepared according to Example 1 and 50% solid alpha-chloracetophenone (hereinafter called CN) in a jar will with subsequent grinding for about 8 hours producing a free flowing and highly dispersible mixture.

The above procedure was followed utilizing the percentages 5%-95% silica to 95%-5% CN. The preferred range being 50%-75% silica to 50%-25% CN with the grinding time varying between 8 and 10 hours.

EXAMPLE 3

A dry mixture comprising 90% ortho-chlorobenzilidene malononitrile (hereinafter called CS) and 10% of the silica, prepared according to Example 1, is placed in a milling jar and milled for about 5.5 hours producing a final mixture with excellent dispersibility characteristics.

The above procedure was repeated employing 95%-5% silica to 5%-95% CS with milling between 4-7 hours.

As a result of our converted colloidal silica, no longer is there any need to consider the solubility factor of the various components in the solvent media as found in the prior art methods, for example, CS is soluble in acetone, and CN is soluble in a volatile naphtha, i.e. Skellysolve F, in view that the silica with other components are milled in a substantially dry state. Therefore, any and all components in a dry state can be combined with our converted silica to give use to a highly dispersible system.

We claim:

1. A process for preparing colloidal hydrophobic silica the steps comprising milling for at least 15 minutes a liquid suspension comprising hydrophilic silica, a fluid organo silicon compound selected from the group consisting of haloorganosilanes and organopolysilazanes in the range of 10-25% by weight based upon the silica and a liquid medium having a boiling point range of 50° to 100° C. containing no readily removable —H or —OH group, said liquid medium is a solvent for the fluid organosilicon compound, and subsequently removing said liquid medium from the suspension producing hydrophobic colloidal silica.

2. The process of claim 1, wherein the fluid organo silicon compound is hexamethyldisilazane.

3. The process of claim 1, wherein the liquid medium is gasoline, naphtha, methyl ethyl ketone, acetone or benzene.

4. The process of claim 1, wherein said fluid organo silicon compound is trichloromethyl silane, trimethylchlorosilane, phenyldimethylbromosilane, hexamethylcyclotrisilazane, hexamethyldisilazane or hexypolysilazane.

5. A process for producing a composition of matter the steps comprising milling for at least 15 minutes a liquid suspension comprising hydrophilic silica, a fluid organo silicon compound selected from the group consisting of haloorganosilane and organosilazanes in the range of 10 to 25% by weight based upon the silica and a liquid medium having a boiling point range of 50° to 100° C. containing no readily removable —H or —OH groups, said liquid medium is a solvent for the fluid organo silicon compound, subsequently removing said liquid medium from the suspension producing hydrophobic silica, and adding dry millable substances of alphachloracetophenone or orthochorobenzilidene malononitrile, said hydrophobic silica being in the proportion of 5-95% by weight to 95-5% by weight of said millable substances and grinding for at least 3 hours in a dry state producing a composition of matter with a particle size of 1-30 microns.

6. The process of claim 5, wherein the fluid organo silicon compound is hexamethyldisilazane.

7. The process of claim 5, wherein the liquid medium is gasoline, naphtha, methyl ethyl ketone, acetone or benzene.

8. The process of claim 5, wherein said fluid organo silicon compound is trichloromethyl silane, trimethylchlorosilane, phenyldimethylbromosilane, hexamethylcyclotrisilazane, hexamethyldisilazane or hexypolysilazane.

References Cited
UNITED STATES PATENTS 3,122,516    2/1964    Polmanteer _____ 117—100Si JOHN D. WELSH, Primary Examiner U.S. Cl. X.R.

117—100; 106—308; 252—305, 351, 385, 383; 51—308